United States Patent
Aurongzeb et al.

(10) Patent No.: US 10,061,346 B2
(45) Date of Patent: Aug. 28, 2018

(54) FOLDED CONTINUOUS MULTIELEMENT TOUCH DISPLAY

(71) Applicant: DELL PRODUCTS L.P., Round Rock, TX (US)

(72) Inventors: Deeder M. Aurongzeb, Austin, TX (US); Lawrence Edward Knepper, Leander, TX (US); Asim Mukarram Siddiqui, Cedar Park, TX (US); Rex W. Bryan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/920,723

(22) Filed: Oct. 22, 2015

(65) Prior Publication Data

US 2017/0115691 A1    Apr. 27, 2017

(51) Int. Cl.
G09G 3/04        (2006.01)
G06F 1/16        (2006.01)
G06F 3/041       (2006.01)

(52) U.S. Cl.
CPC .......... *G06F 1/1618* (2013.01); *G06F 1/1647* (2013.01); *G06F 1/1652* (2013.01); *G06F 3/0416* (2013.01); *G06F 2203/04102* (2013.01)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| | | | | |
|---|---|---|---|---|
| 8,854,332 B1* | 10/2014 | Cho | ...................... | G06F 3/0412 345/173 |
| 2007/0164659 A1* | 7/2007 | Lee | ...................... | G06F 3/1423 313/500 |
| 2010/0064244 A1* | 3/2010 | Kilpatrick, II | ........ | G06F 1/1616 715/773 |
| 2010/0117975 A1* | 5/2010 | Cho | ...................... | G06F 1/1626 345/173 |
| 2010/0208065 A1* | 8/2010 | Heiner | ..................... | G06F 3/011 348/143 |
| 2010/0208417 A1* | 8/2010 | Visser | .................... | G06F 1/1613 361/679.01 |
| 2010/0301328 A1* | 12/2010 | Yamazaki | ........... | H01L 29/4908 257/43 |
| 2012/0014054 A1* | 1/2012 | Ashcraft | ................ | G06F 1/1626 361/679.26 |
| 2012/0200487 A1* | 8/2012 | Dvorak | ................. | G06F 3/0483 345/156 |
| 2012/0244910 A1* | 9/2012 | Hsu | ........................ | G03B 21/10 455/566 |
| 2012/0268411 A1* | 10/2012 | Chen | ..................... | G06F 3/0416 345/174 |
| 2013/0169545 A1* | 7/2013 | Eaton | ................... | H04M 1/0241 345/173 |

(Continued)

*Primary Examiner* — William Lu
(74) *Attorney, Agent, or Firm* — Baker Botts L.L.P.

(57) ABSTRACT

A portable information handling system may be equipped with a folded continuous multielement touch display that covers a front and back surface of a display member. Based on a physical state and a usage case of the portable information handling system, certain elements in the multielement touch display may be selectively deactivated or disabled.

20 Claims, 3 Drawing Sheets

(56) References Cited

U.S. PATENT DOCUMENTS

| | | | |
|---|---|---|---|
| 2013/0215041 A1* | 8/2013 | Kim | G06F 3/0487 345/173 |
| 2013/0229324 A1* | 9/2013 | Zhang | G09G 5/00 345/1.3 |
| 2013/0300686 A1* | 11/2013 | Yoon | G06F 3/041 345/173 |
| 2013/0342473 A1* | 12/2013 | Sultenfuss | G06F 3/044 345/173 |
| 2014/0118317 A1* | 5/2014 | Song | G06F 1/1652 345/204 |
| 2014/0217382 A1* | 8/2014 | Kwon | H01L 51/0097 257/40 |
| 2014/0281444 A1* | 9/2014 | Waltermann | G06F 9/4401 713/1 |

* cited by examiner

FOLDED CONTINUOUS MULTIELEMENT TOUCH DISPLAY

BACKGROUND

Field of the Disclosure

This disclosure relates generally to information handling systems and, more particularly, to a folded continuous multielement touch display.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a disclosed display device is for portable information handling systems. The display device may include a display member hingeably coupled to a base member at a first end, the display member having a multielement touch display fixed thereon. The multielement touch display may include a first touch display element fixed to a first surface of the display member, the first surface facing the base member. The multielement touch display may also include a second touch display element fixed to a second end of the display member opposite the first end, the second touch display element extending from the first surface to a second surface opposite the first surface. The multielement touch display may further include a third touch display element fixed to the second surface of the display member.

In any of the disclosed embodiments of the display device, the first touch display element, the second touch display element, and the third touch display element may be formed as a flexible layer that folds over from the first surface around the second end to the second surface. In any of the disclosed embodiments of the display device, the multielement touch display comprises an organic light emitting diode (OLED) display formed over plastic or flexible glass substrate.

In any of the disclosed embodiments, the display device may further include a display controller for driving the multielement touch display and comprising a processor having access to a memory media storing instructions executable by the processor. The instructions may include instructions to, responsive to receiving user input, selectively deactivate touch operation of at least one of the first touch display, the second touch display, and the third touch display. The user input may specify at least one of the first touch display, the second touch display, and the third touch display. The user input may specify automatic touch deactivation, while the memory media further include instructions to determine an angle between the display member and the base member, determine a usage case for the multielement touch display selected from: desktop usage, desktop non-usage, handheld usage, and carrying non-usage. Based on the angle and the usage case, the instructions may be enabled to selectively deactivate touch operation of at least one of the first touch display, the second touch display, and the third touch display.

In any of the disclosed embodiments of the display device, the instructions may be executable to determine the angle to be less than 20°, determine the usage case to be desktop usage or handheld usage, and deactivate touch operation of the first touch display.

In any of the disclosed embodiments of the display device, the instructions may be executable to determine the angle to be greater than 20°, determine the usage case to be desktop usage, and deactivate touch operation of the third touch display.

In any of the disclosed embodiments of the display device, the instructions may be executable to determine the angle to be less than 20°, determine the usage case to be carrying non-usage, and deactivate touch operation of the first touch display and the third touch display.

In another aspect, a disclosed information handling system includes a display device with a multielement touch display. In a further aspect, a disclosed method is for driving a folded continuous multielement touch display in portable information handling systems.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, and 4 wherein like numbers are used to indicate like and corresponding parts.

Figure 1:
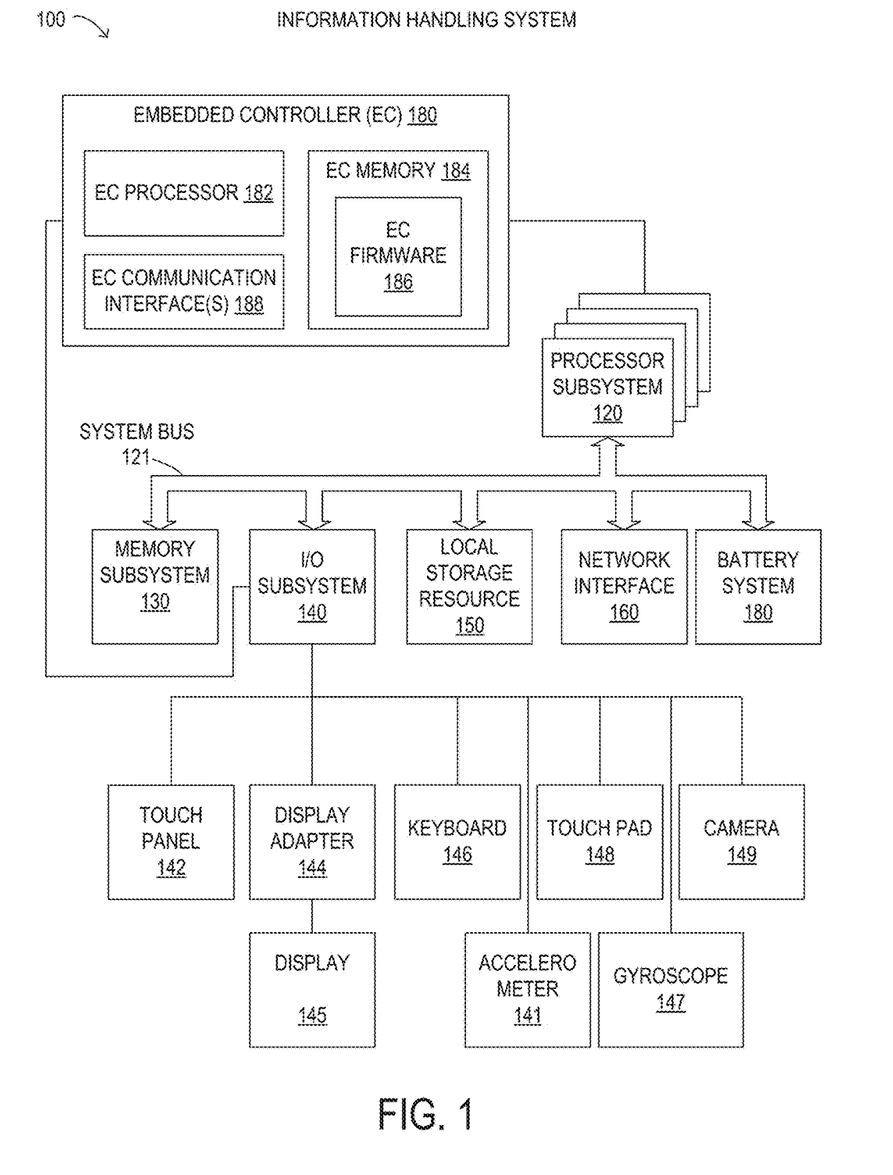
FIG. 1 is a block diagram of selected elements of an embodiment of an information handling system.

Turning now to the drawings, FIG. 1 illustrates a block diagram depicting selected elements of an embodiment of information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, a network interface 160, and battery system 180. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. Also shown is battery system 180, which may represent a rechargeable battery and related components included with information handling system 100.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. Local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142, display adapter 144, keyboard 146, accelerometer 141, touch pad 148, gyroscope 147, and camera 149. Touch panel 142 may include circuitry for enabling touch functionality in conjunction with a display device, shown as display 145, that is driven by display adapter 144. Touch panel 142 may be driven by a touch controller (or touch driver) that may also drive touch pad 148 or another pointing device, such as a mouse that is usable with information handling system 100. Accelerometer 141 and gyroscope 147, among other types of sensors, may be usable to detect orientation, position, movement, and rotation of information handling system 100. Camera 149 may represent any of a variety of imaging devices, such as a video camera, infrared camera, or combinations thereof.

Also shown in FIG. 1 is embedded controller (EC) 180, which may include EC processor 182 as a second processor included with information handling system 100 certain management tasks, including selectively deactivating operation of a folded continuous multielement touch display, as disclosed herein. EC processor 182 may have access to EC memory 184, which may store EC firmware 186, representing instructions executable by EC processor 182. EC firmware 186 may represent pre-boot instructions executable by EC processor 182. For example, EC firmware 186 may be operable to prepare information handling system 100 to boot by activating various hardware components in preparation of launching an operating system for execution. In some embodiments, EC firmware 186 may be referred to as a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable. Furthermore, EC firmware 186 may be in control of EC communication interface(s) 188, which may represent one or more input/output interfaces or signals that embedded controller 180 can use to communicate with other elements of information handling system 100, such as I/O subsystem 140.

In various embodiments of information handling system 100, such as portable devices or so-called all-in-one devices, display 145 may be mechanically integrated to other components. Furthermore, touch panel 142 may be integrated into display 145 such that a touch user interface is provided to a user. The touch user interface typically coincides with a pixel space of display 145 such that touch inputs correspond to certain display pixels, which may present user interface elements, such as buttons, menus, input fields, etc., to the user.

As will be described in further detail herein, display 145 and touch panel 142 may be integrated into a folded continuous multielement touch display in information handling system 100. The multielement touch display may include different individual display touch elements that can be individually deactivated for touch operation, display operation, or both. In various embodiments, EC firmware 186 may include instructions to determine different usage cases for information handling system 100. The usage cases may be determined based on internal sensors (accelerometer 141, gyroscope 147, among others) and detections of user activity (user input to keyboard 146, touch panel 142, among others). Based on the usage cases, EC firmware 186 may be operable to selectively deactivate or disable one or more elements included within the multielement touch display. Additionally, a user input element may enable the user to manually activate one or more of the elements, or to select automatic deactivation or disabling by the EC firmware 186.

Figure 2:
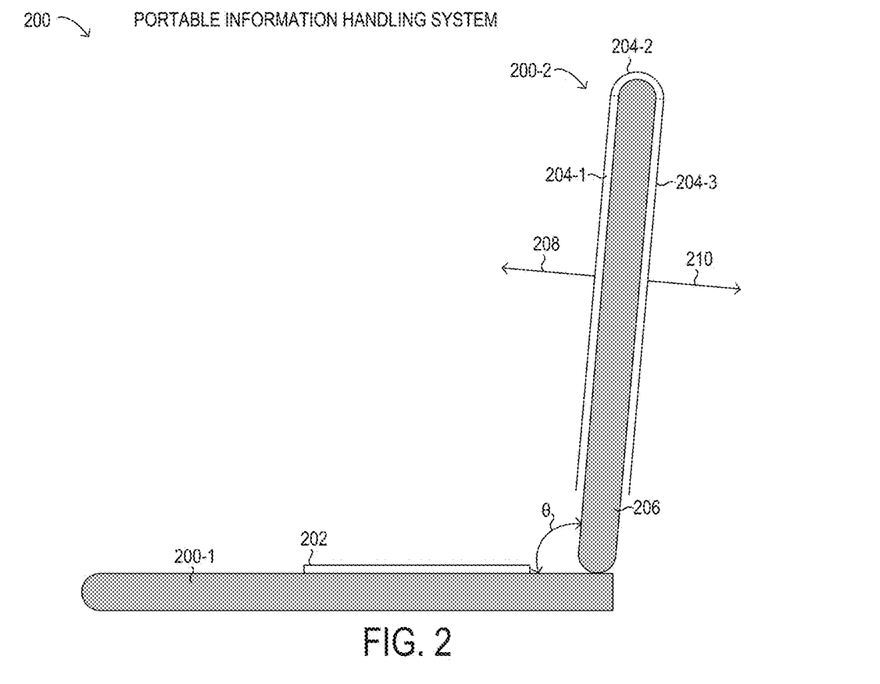
FIG. 2 is a block diagram of selected elements of an embodiment of a portable information handling system including a folded continuous multielement touch display.

Referring now to FIG. 2, selected elements of an embodiment of portable information handling system 200 are shown. Portable information handling system 200 may be an instance of information handling system 100 described above with respect to FIG. 1. It is noted that FIG. 2 is not drawn to scale but is a schematic illustration.

FIG. 2 shows a side external view of portable information handling system 200 that depicts a base member 200-1 and a display member 200-2. Base member 200-1 may include various tactile input devices, such as keyboard 202 and a touch pad, among others. Base member 200-1 may further include various electronic components described above in information handling system 100. Base member 200-1 may be hingeably attached to display member 200-2 such that a user can fold display member 200-2 against base member 200-1 at a hinge point over an angle, shown as angle θ, as a first end. It is noted that portable information handling system 200 may include one or more sensors to detect the angle θ, for example using I/O subsystem 140 (see FIG. 1).

In FIG. 2, display member 200-2 is shown comprising a frame member 206 over which a multielement touch display 204, comprising elements 204-1, 204-2, and 204-3, is fixed or mounted. Multielement touch display 204 may include an array of touch sensors and an array of display pixels, in respective layers. The touch sensor layer and the display pixel layer may be arranged differently in different embodiments, with the touch sensor layer being either on top of or below the display pixel layer. The touch sensor layer may operate using capacitance or resistance to detect human touch. In some embodiments, multielement touch display 204 may include a transparent cover, such as an ultrathin glass or a hardened polymer layer. In multielement touch display 204, the touch sensor layer may include indium tin oxide (ITO) patterned contacts or silver (Ag) nanowire contacts that are formed as a flexible layer using a plastic substrate.

Figure 3:
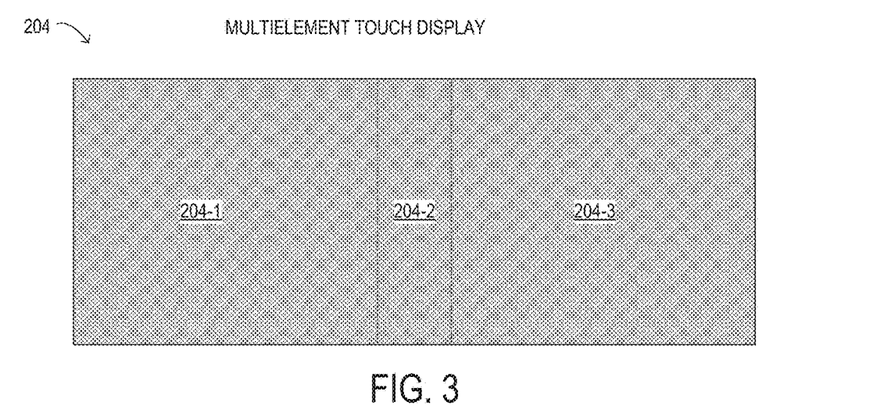
FIG. 3 is a block diagram of selected elements of an embodiment of a folded continuous multielement touch display.

In multielement touch display 204, elements 204-1, 204-2, and 204-3 may be continuously arranged immediately adjacent to one another (see also FIG. 3). Specifically, multielement touch display 204 is folded over frame member 206 at a second end opposite a first end that hinges over angle θ and is attached to base member 200-1. Accordingly, a first display touch element 204-1 may be fixed to a first surface of frame member 206 facing base member 200-1, a second display touch element 204-2 may be folded over the second end of display member 200-2, and a third display touch element 204-3 may be fixed to a second surface of frame member 206 opposite the first surface. The inner portion where second display touch element 204-2 is folded over may be a gap or may be bonded using a polymer or carbon fiber-based composite. The touch sensor layer of second display touch element 204-2 may be laminated using a plastic cover, for example, when the touch sensor layer is an external layer.

It will be understood that the electrical connections to drive multielement touch display 204 based on the components described in FIG. 1 may be internally routed within portable information handling system 200, and are omitted in FIG. 2 for descriptive clarity. In various embodiments, multielement touch display 204 may include a flexible display layer, such as an organic light emitting diode (OLED) layer that is formed on a flexible substrate. The touch sensor layer may be formed over the OLED and may be subsequently sealed using a plastic cover layer. The plastic cover layer may be hardened to withstand abrasion and wear and tear during touch operation.

Referring now to FIG. 3, a block diagram of selected elements of an embodiment of multielement touch display 204 is shown. It is noted that FIG. 3 is not drawn to scale but is a schematic illustration. In FIG. 3, multielement touch display 204 is shown flattened out in a planar arrangement showing a pixel space for first display touch element 204-1, second display touch element 204-2, and third display touch element 204-3. Multielement touch display 204 may vary in size and may be driven by a touch controller and a display controller, as described above. The touch sensor array density and the display pixel density may be different in multielement touch display 204. The touch controller and the display controller may be enabled to deactivate or disable certain portions of multielement touch display 204. For example, touch or display functionality of one or more of first display touch element 204-1, second display touch element 204-2, and third display touch element 204-3 may be individually deactivated or disabled.

In operation of portable information handling system 200, the touch functionality provided with multielement touch display 204 may be highly directionalized. For example, first display touch element 204-1 may be sensitive to touch in direction 208, while third display touch element 204-3 may be sensitive to touch in direction 210. In certain cases, such as when the touch operation is based on capacitive touch sensors, the touch functionality of first display touch element 204-1 and third display touch element 204-3 may interfere with each other and may result in simultaneous operation, which is undesirable. Furthermore, due to their respective arrangement as shown, typically only one of first display touch element 204-1 and third display touch element 204-3 will be operated by a user at a given time for a given usage case. Therefore, it may be desirable to deactivate at least one of the touch functionality and the display functionality of first display touch element 204-1 and third display touch element 204-3 based on a usage case for portable information handling system 200. Deactivation of touch functionality may include disabling the touch sensor layer or reducing the tactile sensitivity of the touch sensor layer. It is noted that a touch sensor density of first touch display element 204-1 may be less than the third touch display element 204-3.

For this purpose, portable information handling system 200 may provide a user input element, such as a slider, a button, a switch, or a virtual user input element in a display touch area, to select which one of first display touch element 204-1 and third display touch element 204-3 is activated at a given time. It is noted that second display touch element 204-2 may remain active for touch and display functionality during any usage case. The user input element may also include an 'AUTO' input choice to enable automatic deactivation of a particular display touch element based on determined usage cases for portable information handling system 200, as will now be described in further detail. In some embodiments, portable information handling system 200 is enabled to perform automatic deactivation of a particular display touch element by default.

The usage cases for portable information handling system 200 may defined as listed in Table 1. It is noted that Table 1 shows an exemplary implementation and that different usage cases may be defined in different embodiments.

TABLE 1

Usage cases for portable information handling system 200

| DESKTOP | HANDHELD | CARRYING |
|---|---|---|
| usage | usage | |
| non-usage | | non-usage |

In Table 1, DESKTOP refers to a physical state of portable information handling system 200 when resting horizontally on a surface, such as a desk or a table. DESKTOP usage may refer to an active functional state of portable information handling system 200, either with display member 200-2 open (such as $\theta > 20°$ or another minimum angle, such as 30° or 45°) and using first display touch element 204-1, or with display member 200-2 closed (such as $\theta < 20°$ or another maximum angle, such as 30° or 45°) and using third display touch element 204-3. DESKTOP non-usage may refer to a passive functional state, such as sleep mode or powered off, during which portable information handling system 200 is not in use and is not receiving user input. HANDHELD usage refers to the physical state of portable information handling system 200 when being held and operated by the user, such as with display member 200-2 closed and using third display touch element 204-3. DESKTOP usage with $\theta < 20°$ (or another maximum angle, such as 30° or 45°) and HANDHELD usage may indicate that portable information handling system 200 is being used as a tablet with direct user input to third display touch element 204-3. CARRYING non-usage refers to the physical state of portable information handling system 200 when being carried while in the passive functional state. In some embodiments, CARRYING non-usage may be associated with motion corresponding to a walking gait of the user. CARRYING non-usage may also be detected based on a size of a contact area of the user's hand with multielement touch display 204. For example, detection of fingertip-sized contact areas at multielement touch display 204 may indicate usage, while a hand-sized contact area may indicate non-usage.

In order to decide which elements in multielement touch display 204 to deactivate or disable, portable information handling system 200 may determine one of the usage cases listed in Table 1. Then, based on the usage case determined, as well as other state information for portable information handling system 200, at least one of first display touch element 204-1, second display touch element 204-2, and third display touch element 204-3 may be deactivated or disabled. Certain particular non-limiting instances of deactivating or disabling multielement touch display 204 are described below. It will be understood that other combinations of criteria and deactivating or disabling logic may be implemented in different embodiments.

In one instance, the angle $\theta$ is determined to be less than 20° (or another maximum angle), the usage case is determined to be DESKTOP usage or HANDHELD usage, and as a result, touch operation of first display touch element 204-1 is deactivated. Display operation of first display touch element 204-1 may also be deactivated.

In another instance, the angle $\theta$ is determined to be greater than 20° (or another minimum angle), the usage case is determined to be DESKTOP usage, and as a result, touch operation of third display touch element 204-3 is deactivated. Display operation of third display touch element 204-3 may also be deactivated, for example, based on an indication from the user.

In a further instance, the angle $\theta$ is determined to be less than 20° (or another maximum angle), the usage case is determined to be CARRYING non-usage, and as a result, touch operation of first display touch element 204-1 and third display touch element 204-3 is deactivated. Display operation of first display touch element 204-1 and third display touch element 204-3 may also be deactivated.

In another instance, the angle $\theta$ is determined to be less than 20° (or another maximum angle), the usage case is determined to be CARRYING non-usage, and as a result, touch and display operation of first display touch element 204-1 and third display touch element 204-3 is deactivated. Touch and display operation of second display touch element 204-2 may be activated, for example, to provide certain virtual buttons, such as virtual function keys among other examples, and to show notifications.

In yet another instance, the angle θ is determined to be between about 70° to 90° (or another range of angles), the usage case is determined to be DESKTOP usage, and a user input indicating a sharing mode may be received. As a result, touch operation of first display touch element 204-1 is deactivated. Display and touch operation of second display touch element 204-2 and third display touch element 204-3 may be activated, while second display touch element 204-2 may be enabled to providing scrolling (or other content controlling functionality) for third display touch element 204-3.

Furthermore, additional user choices may be provided to enable particular functionality. For example, in DESKTOP usage with θ>20° (or another minimum angle), an additional sharing-mode may be provided to activate display functionality while deactivating touch functionality of third display touch element 204-3. In another example, in DESKTOP usage with θ>145° (or another minimum angle), display and touch operation of second display touch element 204-2 may be deactivated.

Figure 4:
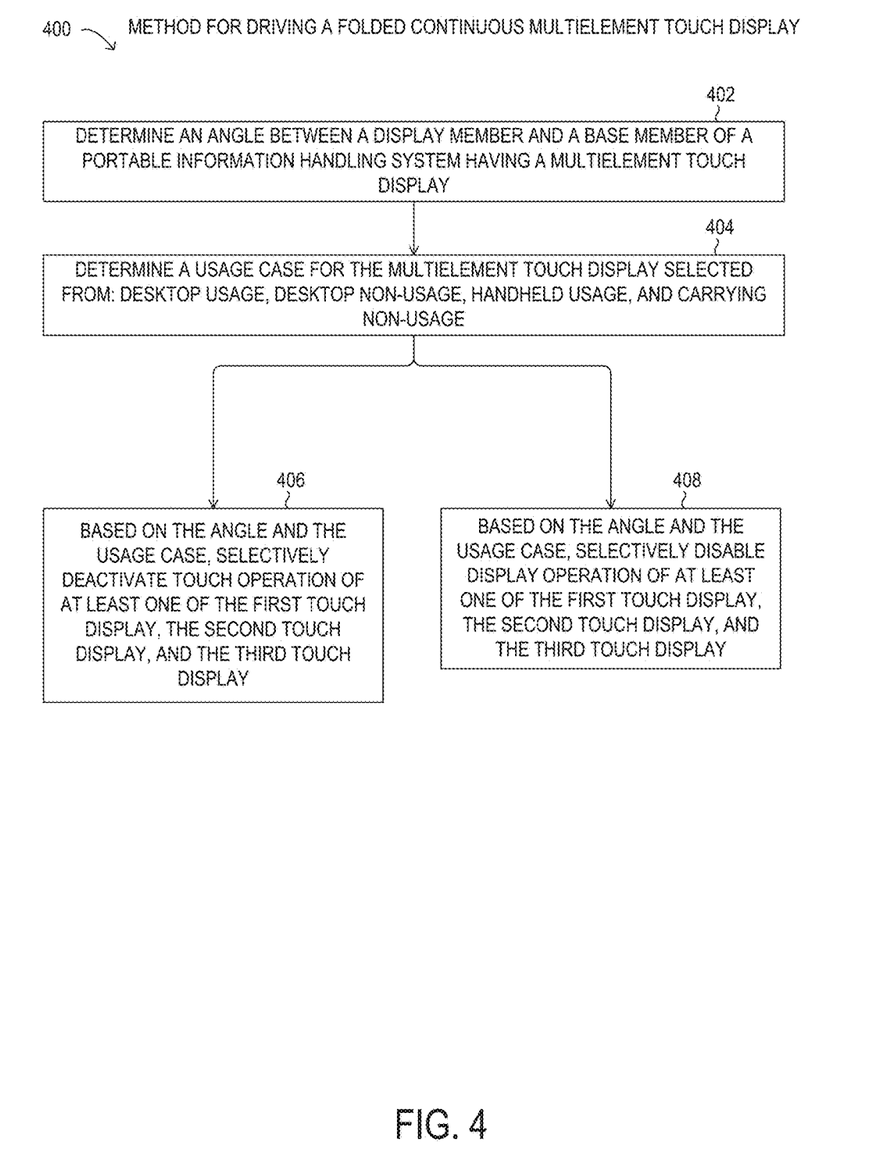
FIG. 4 is a flow chart of selected elements of an embodiment of a method for driving a folded continuous multielement touch display.

Referring now to FIG. 4, a flow chart of selected elements of an embodiment of method 400 for driving a folded continuous multielement touch display, as described herein, is depicted in flowchart form. Method 400 may be performed using information handling system 100, 200 equipped with multielement touch display 204 (see FIGS. 1 and 2) and, in particular, by EC firmware 186 of embedded controller 180 executing on EC processor 182. It is noted that certain operations described in method 400 may be optional or may be rearranged in different embodiments.

Method 400 may begin at, step 402, by determining an angle between a display member and a base member of a portable information handling system having a multielement touch display. At step 404, a usage case may be determined for the multielement touch display selected from: desktop usage, desktop non-usage, handheld usage, and carrying non-usage. After step 404, at step 406, based on the angle and the usage case, touch operation of at least one of the first touch display, the second touch display, and the third touch display may be selectively deactivated. After step 404, at step 408, based on the angle and the usage case, display operation of at least one of the first touch display, the second touch display, and the third touch display may be selectively disabled.

As disclosed herein, a portable information handling system may be equipped with a folded continuous multielement touch display that covers a front and back surface of a display member. Based on a physical state and a usage case of the portable information handling system, certain elements in the multielement touch display may be selectively deactivated or disabled.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A display device for portable information handling systems, comprising:
    a display member hingeably coupled to a base member at a first end, the display member having a multielement touch display fixed thereon, the multielement touch display further comprising:
        a first touch display fixed to a first surface of the display member, the first surface facing the base member;
        a second touch display fixed to a second end of the display member opposite the first end, the second touch display covering the second end from the first surface to a second surface of the display member opposite the first surface; and
        a third touch display fixed to the second surface of the display member, wherein the third touch display is used at the second surface; and
    a display controller for driving the multielement touch display and comprising a processor having access to a memory media storing instructions executable by the processor to:
        determine a usage case for the multielement touch display selected from: desktop usage, desktop non-usage, handheld usage, and carrying non-usage; and
        based on the usage case, selectively disable display operation of at least one of the first touch display, the second touch display, and the third touch display.

2. The display device of claim 1, wherein the first touch display, the second touch display, and the third touch display are formed as a flexible layer that folds over from the first surface around the second end to the second surface.

3. The display device of claim 2, wherein the multielement touch display comprises an organic light emitting diode display.

4. The display device of claim 1, wherein the memory media further comprise instructions to:
    responsive to receiving user input, selectively deactivate touch operation of at least one of the first touch display, the second touch display, and the third touch display.

5. The display device of claim 4, wherein the user input specifies at least one of the first touch display, the second touch display, and the third touch display.

6. The display device of claim 4, wherein the user input specifies automatic touch deactivation, and wherein the memory media further comprise instructions to:
    determine an angle between the display member and the base member; and
    based on the angle and the usage case, selectively deactivate touch operation of at least one of the first touch display, the second touch display, and the third touch display.

7. The display device of claim 6, wherein the instructions are executable to:
    determine the angle to be less than 20°;
    determine the usage case to be desktop usage or handheld usage; and
    deactivate touch operation of the first touch display.

8. The display device of claim 6, wherein the instructions are executable to:
    determine the angle to be greater than 20°;
    determine the usage case to be desktop usage; and
    deactivate touch operation of the third touch display.

9. The display device of claim 6, wherein the instructions are executable to:
    determine the angle to be less than 20°;
    determine the usage case to be carrying non-usage; and deactivate touch operation of the first touch display and the third touch display.

10. The display device of claim 6, wherein selectively deactivating touch operation includes reducing a sensitivity to tactile input of a touch display.

11. An information handling system comprising a display device, the display device further comprising:
 a display member hingeably coupled to a base member at a first end, the display member having a multielement touch display fixed thereon, the multielement touch display further comprising:
  a first touch display fixed to a first surface of the display member, the first surface facing the base member;
  a second touch display fixed to a second end of the display member opposite the first end, the second touch display covering the second end from the first surface to a second surface of the display member opposite the first surface; and
  a third touch display fixed to the second surface of the display member, wherein the third touch display is used at the second surface; and
 a display controller for driving the multielement touch display and comprising a processor having access to a memory media storing instructions executable by the processor to:
  determine a usage case for the multielement touch display selected from: desktop usage, desktop non-usage, handheld usage, and carrying non-usage; and
  based on the usage case, selectively disable display operation of at least one of the first touch display, the second touch display, and the third touch display.

12. The information handling system of claim 11, wherein the first touch display, the second touch display, and the third touch display are formed as a flexible layer that folds over from the first surface around the second end to the second surface.

13. The information handling system of claim 12, wherein the multielement touch display comprises an organic light emitting diode display.

14. The information handling system of claim 11, wherein the memory media further comprise instructions to:
 responsive to receiving user input, selectively deactivate touch operation of at least one of the first touch display, the second touch display, and the third touch display.

15. The information handling system of claim 14, wherein the user input specifies at least one of the first touch display, the second touch display, and the third touch display.

16. The information handling system of claim 14, wherein the user input specifies automatic touch disabling, and wherein the memory media further comprise instructions to:
 determine an angle between the display member and the base member; and
 based on the angle and the usage case, selectively deactivate touch operation of at least one of the first touch display, the second touch display, and the third touch display.

17. The information handling system of claim 16, wherein the instructions are executable to:
 determine the angle to be less than 20°;
 determine the usage case to be desktop usage or handheld usage; and
 deactivate touch operation of the first touch display.

18. The information handling system of claim 16, wherein the instructions are executable to:
 determine the angle to be greater than 20°;
 determine the usage case to be desktop usage; and
 deactivate touch operation of the third touch display.

19. The information handling system of claim 16, wherein the instructions are executable to:
 determine the angle to be less than 20°;
 determine the usage case to be carrying non-usage; and
 deactivate touch operation of the first touch display the third touch display.

20. The information handling system of claim 11, wherein a touch sensor density of the first touch display is less than the second touch display.

* * * * *